United States Patent

Smith

[15] 3,660,123
[45] May 2, 1972

[54] PRODUCTION OF ALPHA-QUARTZ-CRISTOBALITE SILICA FOR POTTERY

[72] Inventor: Albert Richard Smith, Redhill, England

[73] Assignee: British Industrial Sand Limited, Surrey, England

[22] Filed: Feb. 4, 1970

[21] Appl. No.: 8,613

[30] Foreign Application Priority Data

Feb. 5, 1969    Great Britain.......................6,241/69

[52] U.S. Cl. ...............................106/39 R, 23/182, 106/69, 264/56
[51] Int. Cl. ......................................................C04b 33/00
[58] Field of Search..............106/39 R, 45, 69, 46; 23/182; 264/56

[56] References Cited

UNITED STATES PATENTS

| | | | |
|---|---|---|---|
| 3,458,331 | 7/1969 | Krøyer | 106/45 |
| 2,726,964 | 12/1955 | Smoke | 106/46 |
| 2,937,102 | 5/1960 | Wagner | 106/69 X |

OTHER PUBLICATIONS

Ceramic Raw Material, in Ceramic Industry Magazine, (Silica) Chicago, Ill.; Jan. 1967 pp. 138–139.
Kingery, W. D.; Introduction to Ceramics; New York, 1960 p. 137.
Searle, A. B.; Refractory Materials; London, 1950 p. 160.
Sosman, R. B.; The Properties of Silica; New York, 1927 p. 78

*Primary Examiner*—Tobias E. Levow
*Assistant Examiner*—W. R. Satterfield
*Attorney*—Dowell & Dowell

[57] ABSTRACT

There is described a process for the production of silica for use as pottery body from silica sand. A mixture of the silica sand and from 0.3 to 2 percent by weight of the mixture of a calcium compound, calculated as calcium oxide, is calcinated at a temperature of from 1,200° to 1,550° C. for 5 to 60 minutes.

7 Claims, 1 Drawing Figure

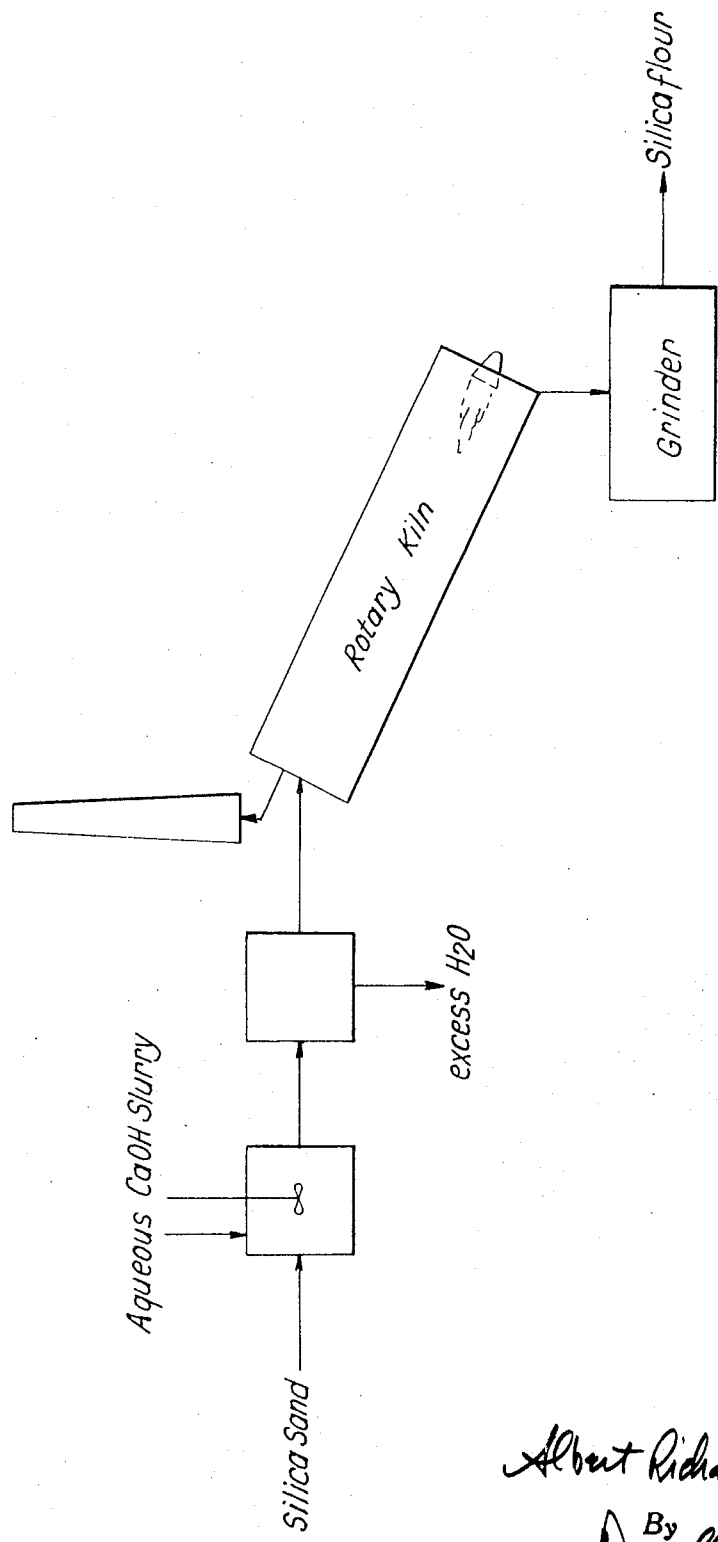

PRODUCTION OF ALPHA-QUARTZ-CRISTOBALITE SILICA FOR POTTERY

This invention relates to the production of silica for pottery and is especially concerned with a process for preparing a silica suitable for pottery body from silica sands.

BACKGROUND TO THE INVENTION

Silica is one of the principle constituents of pottery body and the main source of the silica which is incorporated in the pottery has been the flint pebbles which occur as, for example, beach deposits in coastal areas and also in limestone and chalk beds in inland areas.

The flint pebbles are calcined so as to bring about a partial conversion to cristobalite of the micro-crystalline alpha-quartz which is the main constituent of flint. The calcination also burns out any organic matter present in the flint and the final product is white. The resulting pebbles are then fragmented and crushed and milled to a fine powder which is incorporated in the slurry or slip constituting the pottery body.

The known deposits of flint are becoming progressively exhausted and it would therefore be advantageous to be able to replace the flint by using silica from ordinary silica sand which occurs widely in nature. Such silica sand consists of crystalline alpha-quartz and although attempts have been made in the past to use ground silica sand as a pottery body these attempts have been unsuccessful because of the difference in thermal expansion between quartz from sand and calcined flint. This has resulted in the cracking of the pottery body during firing and even when this could be overcome by varying the composition of the pottery body it was then difficult to prepare a suitable glaze for this pottery body.

When quartz is heated to a high temperature in the presence of certain alkali and alkaline earth metal compounds conversion of quartz to cristobalite takes place. The resulting converted material, however, cannot normally be incorporated in a pottery body in place of at least some of the calcined flint without encountering difficulties of thermal expansion.

We have now found that by heating silica sand under particular conditions we can obtain a product which can be satisfactorily introduced as a component of pottery body.

THE INVENTION

According to the invention therefore we provide a process in which a mixture of silica sand and a calcium compound are calcined at a temperature of from 1,200° to 1,550° C. for a time of from 5 to 60 minutes, the proportion of calcium compound calculated as calcium oxide being from 0.3 to 2 percent by weight of the mixture.

According to the process of the invention a partial conversion of the quartz to cristobalite occurs. The resulting material when ground to the same fineness as the calcined flint normally used is now found to be perfectly satisfactory for incorporation into pottery body. Also the finely ground resulting material can be used to prepare a slip which can be handled in the normal way. This does not happen when silica sand is heated with a sodium salt since then the resulting particles when ground and mixed with water gives a slurry or slip which rapidly phase separates and can therefore only be used with great difficulty in the preparation of pottery articles.

The product of the process is a mixture of alpha-quartz and cristobalite and its specific gravity is generally from about 2.45 to 2.60 which is of course between the value for alpha-quartz which is 2.65 and the value for cristobalite which is 2.32. The product of the invention therefore has a content of cristobalite of from about 60 to 5 percent respectively.

The exact content of cristobalite can be varied in a number of ways. With a fixed calcination time and temperature an increased amount of calcium compound will increase the degree of conversion of quartz to cristobalite. On the other hand for a fixed addition of calcium compound more cristobalite is formed as the temperature or time are increased.

It is found that if more than 2 percent of the calcium compound calculated as lime is added then the properties of the slip prepared from the resulting finely ground material are unfavourably affected. In practice it is usually preferred to use less than 2 percent of the calcium compound calculated as lime and the preferred range is from 0.3 to 1.5 percent.

The preferred calcium compound to be mixed with the silica is calcium oxide or lime since this is readily available and relatively cheap. Other calcium compounds such as the hydroxide or carbonate can also be used however.

The starting silica sand should have a high content of silica, for example, at least around 98 percent and it can be cleaned of impurities before use. For example it may be washed to remove clay and other impurities and possibly bleached to remove stains and the like.

DESCRIPTION OF A PARTICULAR EMBODIMENT

In one particular embodiment of the invention a high silica sand was treated with an aqueous slurry containing from 3 to 5 percent by weight of calcium hydroxide. The excess liquid was removed by filtration so as to leave 8 to 10 percent moisture in the sand and 0.3 to 0.5 percent by weight of calcium oxide as the hydroxide mixed with the sand.

This mixture was then calcined by passing it through a rotary kiln, for example of the type used in the manufacture of cement, where the temperature was raised to around 1,470° to 1,530° C. The size of the kiln was such that the sand and calcium hydroxide mixture remained in it for 20 to 30 minutes.

After discharge and cooling the sand was ground to a suitable fineness and was found to have a specific gravity of 2.56 corresponding to about 25 to 30 percent of cristobalite. The resulting ground silica flour was then eminently suitable for use in pottery manufacture in the preparation of a slurry or slip containing the treated silica either as the main component or in place of part of the calcined flint without problems of differing thermal expansion and resulting cracking.

The attached drawing is a flow diagram illustrating the above described embodiment of the invention.

An additional advantage of the material produced according to the invention is that it is very white. Whereas most silica sands have a yellow or pink colour the reaction with the calcium compound during calcination appears to remove almost all traces of colour and leaves a product which is very white in appearance. This is of course an important advantage in the manufacture of pottery since it reduces or obviates the necessity of using opaque glazes to make the pottery body colourless.

The calcium compound can of course be mixed with the silica sand in any suitable way. We have described above how the sand can be mixed with a slurry of calcium hydroxide. Alternatively the dry calcium salt and dried sand can be mixed. When a slurry is prepared, excess liquid can be removed in any suitable way such as by natural draining or centrifuging.

Also the type of furnace in which the mixture is calcined is not critical provided of course the desired temperature range is achieved for the specified time period. Besides rotary kilns, tunnel kilns, fluidised bed furnaces or sinter strands can be used. Also the way in which heat is supplied to the mixture is immaterial and can for example be by the combustion of fuel oil, town or producer gas or natural gas or by indirect heating such as electrical heating.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A process for the production of silica in the form of a mixture of Alpha quartz and cristobalite having a specific gravity of from about 2.45 to 2.60 which comprises the step of calcining a mixture of silica sand and a calcium compound at a temperature of from 1,200° to 1,550° C for a time of from 5 to 60 minutes, the proportion of said calcium compound calculated as calcium oxide being from 0.3 to 2 percent by weight of said mixture.

2. A process according to claim 1 in which the proportion of said calcium compound calculated as calcium oxide is from 0.3 to 1.5 percent by weight of said mixture.

3. A process according to claim 1 in which the calcium compound is calcium oxide.

4. A process according to claim 1 in which the calcium compound is one chosen from the group consisting of calcium hydroxide and calcium carbonate.

5. A process according to claim 1 in which said silica sand has a content of silica of at least 98 percent.

6. A process according to claim 1 in which said mixture is calcined at a temperature of around 1,470° to 1,530° C.

7. A process according to claim 6 in which said mixture is calcined from from 20 to 30 minutes.

* * * * *